United States Patent
Kim

(10) Patent No.: US 7,069,049 B2
(45) Date of Patent: Jun. 27, 2006

(54) APPARATUS AND METHOD FOR CONTROLLING DUPLICATION STRUCTURE OF BASE STATION TRANSCEIVER SUBSYSTEM IN A MOBILE COMMUNICATION SYSTEM

(75) Inventor: Jae-Jin Kim, Suwon-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 566 days.

(21) Appl. No.: 10/624,484

(22) Filed: Jul. 23, 2003

(65) Prior Publication Data

US 2004/0121776 A1 Jun. 24, 2004

(30) Foreign Application Priority Data

Dec. 11, 2002 (KR) .................. 10-2002-0078675

(51) Int. Cl.
*H04B 1/38* (2006.01)
*H04M 1/00* (2006.01)

(52) U.S. Cl. .............. 455/561; 455/560; 455/553.1; 455/450; 455/456.5; 455/522; 455/574; 455/509; 455/17; 455/21; 455/23; 455/88; 455/127; 455/451; 455/447

(58) Field of Classification Search ............ 455/561, 455/562.1, 127.5, 450, 447, 451, 446, 456.5, 455/522, 75, 560, 77, 571, 574, 553.1, 509, 455/23, 17, 88, 21

See application file for complete search history.

(56) References Cited

U.S. PATENT DOCUMENTS 5,493,695 A * 2/1996 Aitkenhead et al. ........ 455/509
6,081,515 A * 6/2000 Toivola .................... 370/339
2002/0019235 A1 * 2/2002 Kim et al. ................. 455/451

* cited by examiner

*Primary Examiner*—Nick Corsaro
*Assistant Examiner*—Shaima Q. Aminzay
(74) *Attorney, Agent, or Firm*—Roylance, Abrams, Berdo & Goodman, LLP

(57) ABSTRACT

An apparatus and method for controlling a duplication structure of a Base station Transceiver Subsystem (BTS) is provided. The BTS has N number of sectors including a first sector to an Nth sector and M number of Frequency Assignments (FAs) including a first FA to an Nth FA. The apparatus and method includes N number of power dividers, each of which has M number of output ports and one redundancy output port, each of the power dividers dividing an input signal into equal-power signals each having 1/(M+1) power and outputting the power-divided signals through the M number of output ports and one redundancy output port. The apparatus and method further includes (N×M) number of receivers for demodulating signals outputted from the output ports of the N number of power dividers, respectively; a redundancy receiver for demodulating a signal which has been processed by and is switched over from one of the (N×M) number of receivers according to a predetermined control; a switch connected to each of redundancy output ports of the N number of power dividers, the switch connecting a signal outputted from one of the redundancy output ports to the redundancy receiver according to a predetermined control; and a controller which monitors operation states of the (N×M) number of receivers and controls the switch to connect a redundancy signal to the redundancy receiver when the controller detects one abnormally-operating receiver from among the (N×M) number of receivers, the redundancy signal being outputted from a redundancy output port of a power divider connected to the abnormally-operating receiver.

14 Claims, 6 Drawing Sheets

US 7,069,049 B2

APPARATUS AND METHOD FOR CONTROLLING DUPLICATION STRUCTURE OF BASE STATION TRANSCEIVER SUBSYSTEM IN A MOBILE COMMUNICATION SYSTEM

PRIORITY

This application claims priority under 35 U.S.C. § 119 to an application entitled "Apparatus for controlling duplication structure of base station transceiver subsystem in mobile communication system" filed in the Korean Industrial Property Office on Dec. 11, 2002 and assigned Ser. No. 2002-78675, the contents of which are hereby incorporated by reference.

BACKGROUND OF THE INVENTION

1. Field of the Invention

The present invention relates to an apparatus and method for a mobile communication system, and more particularly to an apparatus and method for controlling the duplication structure of a base station transceiver subsystem in the mobile communication system having a sector structure.

2. Description of the Related Art

FIG. 1 is a block diagram illustrating an internal structure of a conventional base station transceiver subsystem having three sectors and two frequency assignments.

In general, a Base station Transceiver Subsystem (BTS) in a mobile communication system using a general Code Division Multiple Access (CDMA) scheme has a sectoral cell structure. Sectoral cell structure refers to a structure in which a cell covered by the BTS is divided into and managed as a predetermined number of sectors. Here, the BTS has a cell including the three sectors of $\alpha$, $\beta$, and $\gamma$. The number of frequency assignments (FAs) used by the BTS may be variable according to the circumstances. Further, the BTS employs power dividers and power combiners. The power divider/power combiner may have different constructions according to configurations and capacity of the corresponding BTS, such as FA structure and sector structure of the BTS.

Referring to FIG. 1, the BTS has three sectors and two FAs. Therefore, each of the three sectors has a reception structure for each of the two FAs. That is, for the $\alpha$ sector, the BTS includes an antenna 111, a band pass filter 113, and a power divider 115. For the $\beta$ sector, the BTS includes an antenna 121, a band pass filter 123, and a power divider 125. Also, for the $\gamma$ sector, the BTS includes an antenna 131, a band pass filter 133, and a power divider 135. In addition, the BTS includes a 6:7 switch 150, a receiving section 160, and a controller 161. The 6:7 switch 150 connects signals outputted from the power dividers 115, 125, and 135 to corresponding receivers in the receiving section 160. The receiving section 160 includes receivers for processing $\alpha$ sector signals, receivers for processing $\beta$ sector signals, receivers for processing $\gamma$ sector signals, and a redundancy receiver provided for a case where any of the receivers for processing the $\alpha$, $\beta$, and $\gamma$ sector signals functions erroneously. The controller 161 controls the operation of the 6:7 switch for connecting the signals from the power dividers 115, 125, and 135 to the corresponding receivers in the receiving section 160 according to the states of the corresponding receivers.

Hereinafter, processes through which signals received through the $\alpha$, $\beta$, and $\gamma$ sectors are transferred to the corresponding receivers will be described, and a process through which a signal received through the $\alpha$ sector is transferred to corresponding receivers will be first described.

First, when an $\alpha$ sector signal is received through the antenna 111, the antenna 111 outputs the received signal to the band pass filter 113. The band pass filter 113 receives the signal outputted from the antenna 111, filters the received signal in accordance with a predetermined band, and then outputs the filtered signal to the power divider 115. Here, the band pass filter 113 eliminates components of unnecessary bands included in the signal outputted from the antenna 111 through the filtering. The power divider 115 divides the signal outputted from the band pass filter 113 into two half-power signals and outputs the half-power signals to the 6:7 switch 150. Here, the power divider 115 divides the signal outputted from the band pass filter 113 into two half-power signals because the BTS has two FAs. Meanwhile, the 6:7 switch 150 has six input ports and seven output ports. The six input ports are assigned in pairs to each of the power dividers 115, 125, and 135 connected to the three sectors, respectively. In other words, in the 6:7 switch 150, input ports 1 and 2 receive the two signals outputted from the power divider 115 for processing the $\alpha$ sector signal, input ports 3 and 4 receive two signals outputted from the power divider 125 for processing the $\beta$ sector signal, and input ports 5 and 6 receive two signals outputted from the power divider 135 for processing the $\gamma$ sector signal. Then, the 6:7 switch 150 transfers the signals, which have been inputted through the input ports 1 and 2, through output ports 11 and 12 to corresponding receivers, that is, a first receiver 117 and a second receiver (not shown) in the receiving section 160.

Second, a process through which a signal received through the $\beta$ sector is transferred to corresponding receivers will be described below.

When a $\beta$ sector signal is received through the antenna 121, the antenna 121 outputs the received signal to the band pass filter 123. The band pass filter 123 receives the signal outputted from the antenna 121, filters the received signal in accordance with a predetermined band, and then outputs the filtered signal to the power divider 125. The power divider 125 divides the signal outputted from the band pass filter 123 into two half-power signals and outputs the half-power signals to the 6:7 switch 150. Then, the 6:7 switch 150 receives the signals from the power divider 125 through the input ports 3 and 4 and transfers the signals through output ports 13 and 14 to corresponding receivers, that is, third receiver (not shown) and fourth receiver (not shown) in the receiving section 160.

Third, a process through which a signal received through the $\gamma$ sector is transferred to corresponding receivers will be described below.

When a $\gamma$ sector signal is received through the antenna 131, the antenna 131 outputs the received signal to the band pass filter 133. The band pass filter 133 receives the signal outputted from the antenna 131, filters the received signal in accordance with a predetermined band, and then outputs the filtered signal to the power divider 135. The power divider 135 divides the signal outputted from the band pass filter 133 into two half-power signals and outputs the half-power signals to the 6:7 switch 150. Then, the 6:7 switch 150 receives the signals from the power divider 135 through the input ports 5 and 6 and transfers the signals through output ports 15 and 16 to corresponding receivers, that is, a fifth receiver (not shown) and a sixth receiver 127 in the receiving section 160.

While the signals received through the $\alpha$, $\beta$, and $\gamma$ sectors in this way are normally demodulated in the corresponding receivers, any receiver from among the receivers described above may function erroneously. When one of the receivers functions erroneously, the redundancy receiver 137 is used instead of the erroneous receiver which cannot perform a normal operation of demodulating a received signal. That is, the connection is switched over from the erroneous receiver to the redundancy receiver 137, so that the redundancy receiver 137 in place of the erroneous receiver can perform the demodulation of the received signal. The controller 161 periodically monitors the states of the receivers. When the controller 161 detects the existence of any erroneous receiver from among the receivers, the controller 161 controls the 6:7 switch 150 to connect the signal, which has been connected to an output port connected to the erroneous receiver, to another output port connected to the redundancy receiver 137, that is, the output port 17.

For example, when the first receiver 117 functions erroneously, the controller 161 detects the error function of the first receiver 117 and controls the 6:7 switch 150 to switch the connection over from the first receiver 117 to the redundancy receiver 137. As the connection is switched over from the first receiver 117 to the redundancy receiver 137 by the controller 161, the signal having been connected to the first receiver 117, which is inputted through the input port 1, is connected to the output port connected to the redundancy receiver 137, that is, the output port 17. As a result, the BTS can always perform exact demodulation of received signals by switching over from the erroneous receiver to the redundancy receiver.

While the above description with reference to FIG. 1 is given of an internal structure, especially a receiver connection structure, of a BTS having three sectors and two FAs, an internal structure of a BTS having four FAs with no sectoral structure will be described hereinafter with reference to FIG. 2.

FIG. 2 schematically is a block diagram illustrating an internal structure of a conventional BTS having four FAs with no sectoral structure.

The BTS may have either a sectoral structure as that described with reference to FIG. 1 or an omni-directional structure having no sector. The BTS shown in FIG. 2 has an omni-directional structure in which the BTS receives signals via a single omni-directional antenna.

Referring to FIG. 2, when a signal is received through an antenna 211, the antenna 211 outputs the received signal to a band pass filter 213. The band pass filter 213 receives the signal outputted from the antenna 211, filters the received signal in accordance with a predetermined band, and then outputs the filtered signal to a power divider 215. In this case, the band pass filter 213 eliminates components of unnecessary bands included in the signal outputted from the antenna 211 through the filtering. The power divider 215 divides the signal outputted from the band pass filter 213 into four quarter-power signals and outputs the four quarter-power signals to a 4:5 switch 217. Here, the power divider 215 divides the signal outputted from the band pass filter 213 into four quarter-power signals because the BTS has four FAs. Meanwhile, the 4:5 switch 217 has four input ports and five output ports. That is to say, the 4:5 switch 217 receives the four signals power-divided in the power divider 215 through the input ports 1 to 4 and connects them to corresponding output ports 11 to 14. In the 4:5 switch 217, a signal inputted through the input port 1 is connected to the output port 11, a signal inputted through the input port 2 is connected to the output port 12, a signal inputted through the input port 3 is connected to the output port 13, and a signal inputted through the input port 4 is connected to the output port 14.

Then, the signal connected to the output port 11 is inputted to the first receiver 221, the signal connected to the output port 12 is inputted to the second receiver 223, the signal connected to the output port 13 is inputted to the third receiver 225, and the signal connected to the output port 14 is inputted to the fourth receiver 227. While the signals received in this way are normally demodulated in the corresponding receivers, any receiver from among the receivers described above may function erroneously. When one of the receivers functions erroneously, the redundancy receiver 229 is used in place of the erroneous receiver which cannot perform a normal operation of demodulating a received signal. That is, the connection is switched over from the erroneous receiver to the redundancy receiver 229, so that the redundancy receiver 229 can perform the demodulation of the received signal on behalf of the erroneous receiver. The controller 219 periodically monitors the states of the receivers. When the controller 219 detects the existence of any erroneous receiver from among the receivers, the controller 219 controls the 4:5 switch 217 to connect the signal, which was connected to an output port connected of the erroneous receiver, to another output port connected to the redundancy receiver 229, that is, the output port 15.

For example, when the first receiver 221 functions erroneously, the controller 219 detects the error function of the first receiver 221 and controls the 4:5 switch 217 to switch the connection over from the first receiver 221 to the redundancy receiver 229. As the connection is switched over from the first receiver 221 to the redundancy receiver 229 by the controller 219, the signal having been connected to the first receiver 221, which is inputted through the input port 1, is connected to the output port 15 connected to the redundancy receiver 229. As a result, the BTS can always perform an exact demodulation of received signals by switching the connection over from the erroneous receiver to the redundancy receiver.

While the above description with reference to FIG. 2 is given of an internal structure, especially a receiver connection structure, of a BTS having four FAs with no sectoral structure, an internal structure of a BTS having three sectors and M number of FAs will be described hereinafter with reference to FIG. 3.

FIG. 3 is a block diagram illustrating an internal structure of a conventional BTS having three sectors and M number of FAs.

In the following description in relation to FIG. 3, description about antennas 311, 321, and 331 and band pass filters 313, 323, and 333 will be omitted because they perform the same functions as those of the antenna 111, 121, and 131 and band pass filters 113, 123, and 133 shown in FIG. 1. Although the power dividers 315, 325, and 335 perform the power-dividing operations in the same manner as the power dividers 115, 125, and 135 in FIG. 1, since the BTS has M number of FAs, each of the power dividers 315, 325, and 335 divides an input signal into M number of equal-power signals each having a 1/M power and outputs the divided signals to an N:(N+1) switch 350. Here, N represents 3M. Then, the N:(N+1) switch 350 receives signals outputted from the power dividers 315, 325, and 335 and connects the signals to corresponding receivers of the receiving section 370, which means the first to Nth receivers 317 to 373. Here, the N:(N+1) switch 350 has N number of input ports, that is, input ports 1 to N, and (N+1) number of output ports, that is, output ports 1(1) to 1(N+1). In the N:(N+1) switch 350, the N number of input ports receive the signals outputted from the power dividers 315, 325, and 335, and the output ports 1(1) to 1(N) from among the (N+1) number of output ports connect the signals inputted through the N number of input ports to the first to Nth receivers 371 to 373. Further, the remaining one output port, namely the output port 1(N+1), is connected to a redundancy receiver 375.

While the signals received in this way are normally demodulated in the corresponding receivers, any receiver from among the receivers described above may function erroneously. When one of the receivers functions erroneously, the redundancy receiver 375 is used in place of the erroneous receiver which cannot perform a normal operation of demodulating a received signal. That is, the connection is switched over from the erroneous receiver to the redundancy receiver 375, so that the redundancy receiver 375 can perform the demodulation of the received signal on behalf of the erroneous receiver. The controller 351 periodically monitors states of the receivers. When the controller 351 detects the existence of any erroneous receiver from among the receivers, the controller 351 controls the N:(N+1) switch 350 to connect the signal, which was connected to an output port of the erroneous receiver, to another output port connected to the redundancy receiver 375.

For example, if the first receiver 371 functions erroneously, the controller 351 detects the error function of the first receiver 371 and controls the N:(N+1) switch 350 to switch the connection over from the first receiver 371 to the redundancy receiver 375. In the N:(N+1) switch 350, as the connection is switched over from the first receiver 371 to the redundancy receiver 375 by the controller 351, the signal that was connected to the first receiver 371, which is inputted through the input port 1, is connected to the output port connected to the redundancy receiver 375, which means the output port N+1. As a result, the BTS can always perform exact demodulation of received signals by switching the connection over from the erroneous receiver to the redundancy receiver.

As apparent from the above description, the switch construction of the BTS is determined by the number of receivers provided at the BTS, which means that the switch construction depends on the number of receivers from which a redundancy receiver must be prepared for erroneous functioning. For example, when the BTS has seven receivers including a redundancy receiver, the BTS needs a 6:7 switch. As the number of receivers for any trouble of which the redundancy receiver must prepare increases, the switch construction becomes correspondingly more complicated. When the number of receivers for any trouble of which the redundancy receiver must prepare is 12, the BTS has 13 receivers including the redundancy receiver, which requires the BTS to be provided with a 12:13 switch. The 12:13 switch should have 25 ports including 12 input ports and 13 output ports. An increase in the number of the ports in the switch increases the size of the switch, thereby causing the switch to occupy a larger space. Further, as the number of the ports increases, supplementary devices for controlling the ports correspondingly increase, thereby increasing the manufacturing cost. Further, it is impossible to know the state of the redundancy receiver before the redundancy receiver is used. Therefore, even after the connection is switched over from a erroneous receiver to an abnormally operating redundancy receiver, it is still impossible to demodulate the signal that was processed by the erroneous receiver, which causes it to be impossible for the BTS to normally operate, thereby deteriorating the quality of service by the BTS.

SUMMARY OF THE INVENTION

Accordingly, the present invention has been made to solve the above-mentioned problems occurring in the prior art, and an object of the present invention is to provide an apparatus and method for controlling a duplication structure of a Base station Transceiver Subsystem (BTS) in a mobile communication system, which has a minimized switch structure.

It is another object of the present invention to provide an apparatus and method for controlling a duplication structure of a Base station Transceiver Subsystem (BTS) in a mobile communication system, which can continuously monitor the state of a redundancy receiver.

In order to substantially accomplish this object, there is provided an apparatus and method for controlling a duplication structure of a Base station Transceiver Subsystem (BTS), the BTS having N number of sectors including a first sector to an Nth sector and M number of Frequency Assignments (FAs) including a first FA to an Nth FA, the apparatus comprising: N number of power dividers, each of which has M number of output ports and one redundancy output port, each of the power dividers dividing an input signal into equal-power signals each having 1/(M+1) power and outputting the power-divided signals through the M number of output ports and one redundancy output port; (N×M) number of receivers for demodulating signals outputted from the output ports of the N number of power dividers, respectively; a redundancy receiver for demodulating a signal which has been processed by and is switched over from one of the (N×M) number of receivers according to a predetermined control; a switch connected to each of redundancy output ports of the N number of power dividers, the switch connecting a signal outputted from one of the redundancy output ports to the redundancy receiver according to a predetermined control; and a controller which monitors operation states of the (N×M) number of receivers and controls the switch to connect a redundancy signal to the redundancy receiver when the controller detects one abnormally-operating receiver from among the (N×M) number of receivers, the redundancy signal being outputted from a redundancy output port of a power divider connected to the abnormally-operating receiver.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Several embodiments of the present invention will be described with reference to the accompanying drawings. In the following description of the present invention, a detailed description of known functions and configurations incorporated has been omitted for conciseness.

Figure 1:
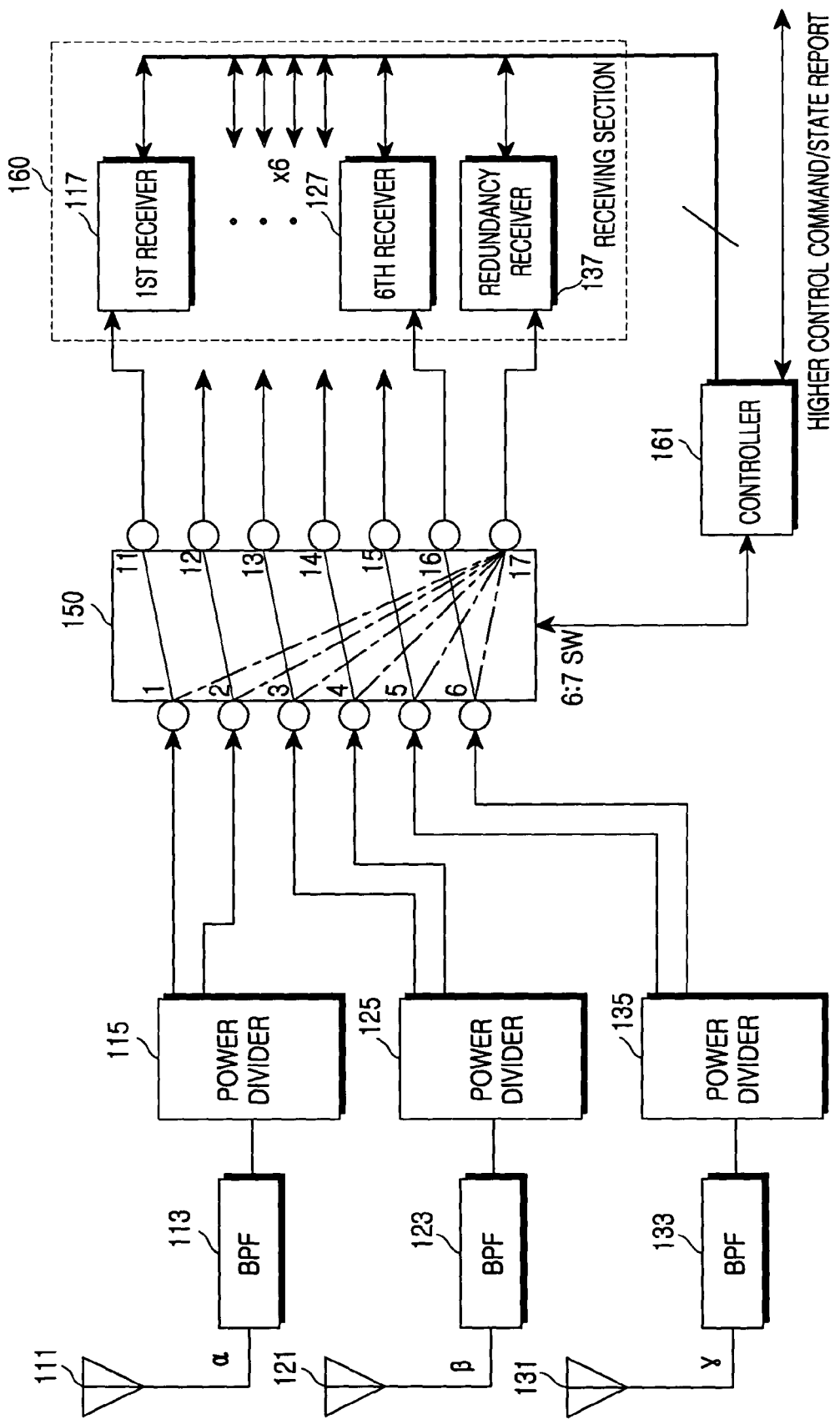
FIG. 1 is a block diagram illustrating an internal structure of a conventional BTS having three sectors and two frequency assignments.
Figure 2:
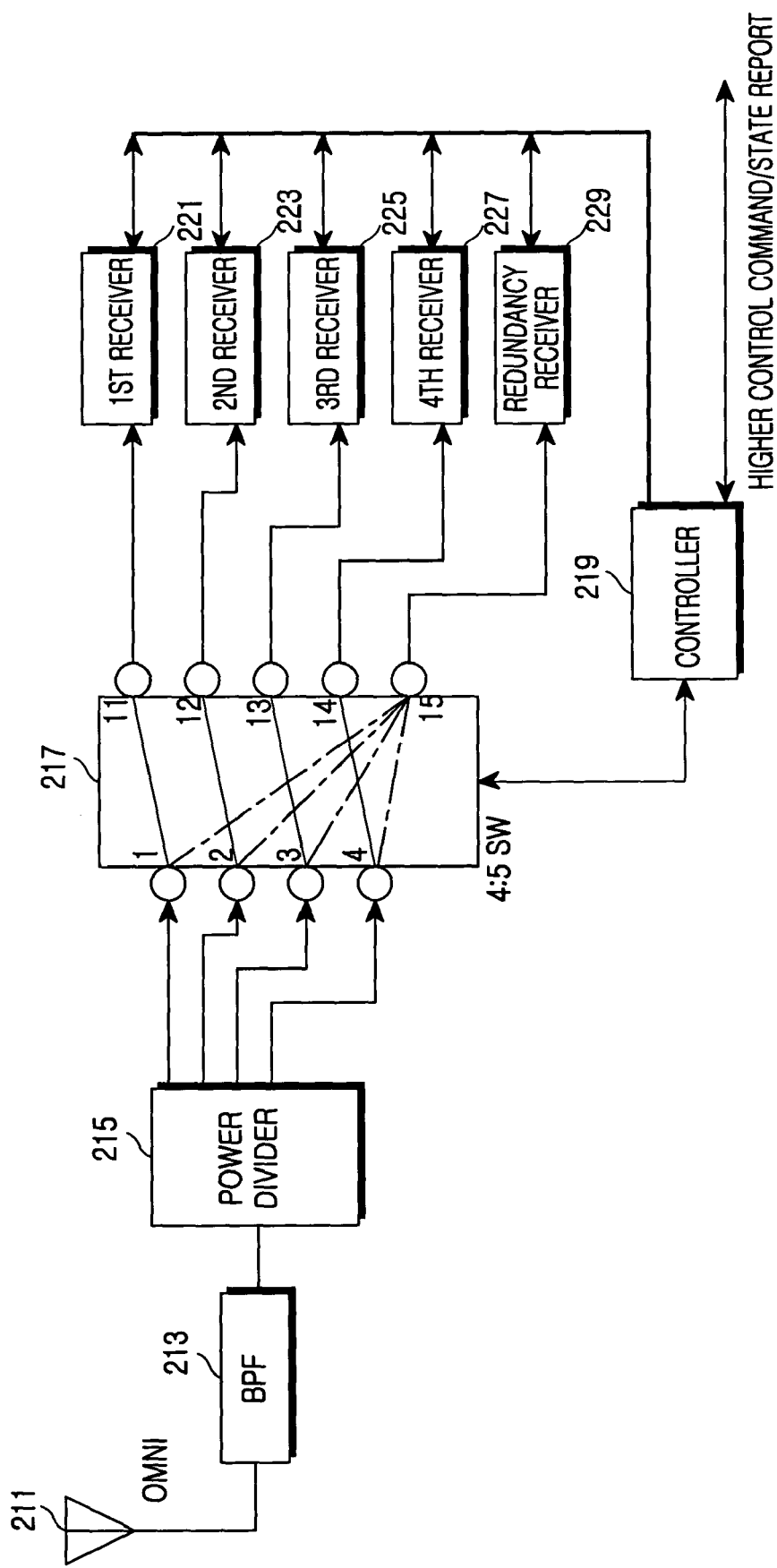
FIG. 2 is a block diagram illustrating an internal structure of a conventional BTS having four FAs with no sectoral structure.
Figure 3:
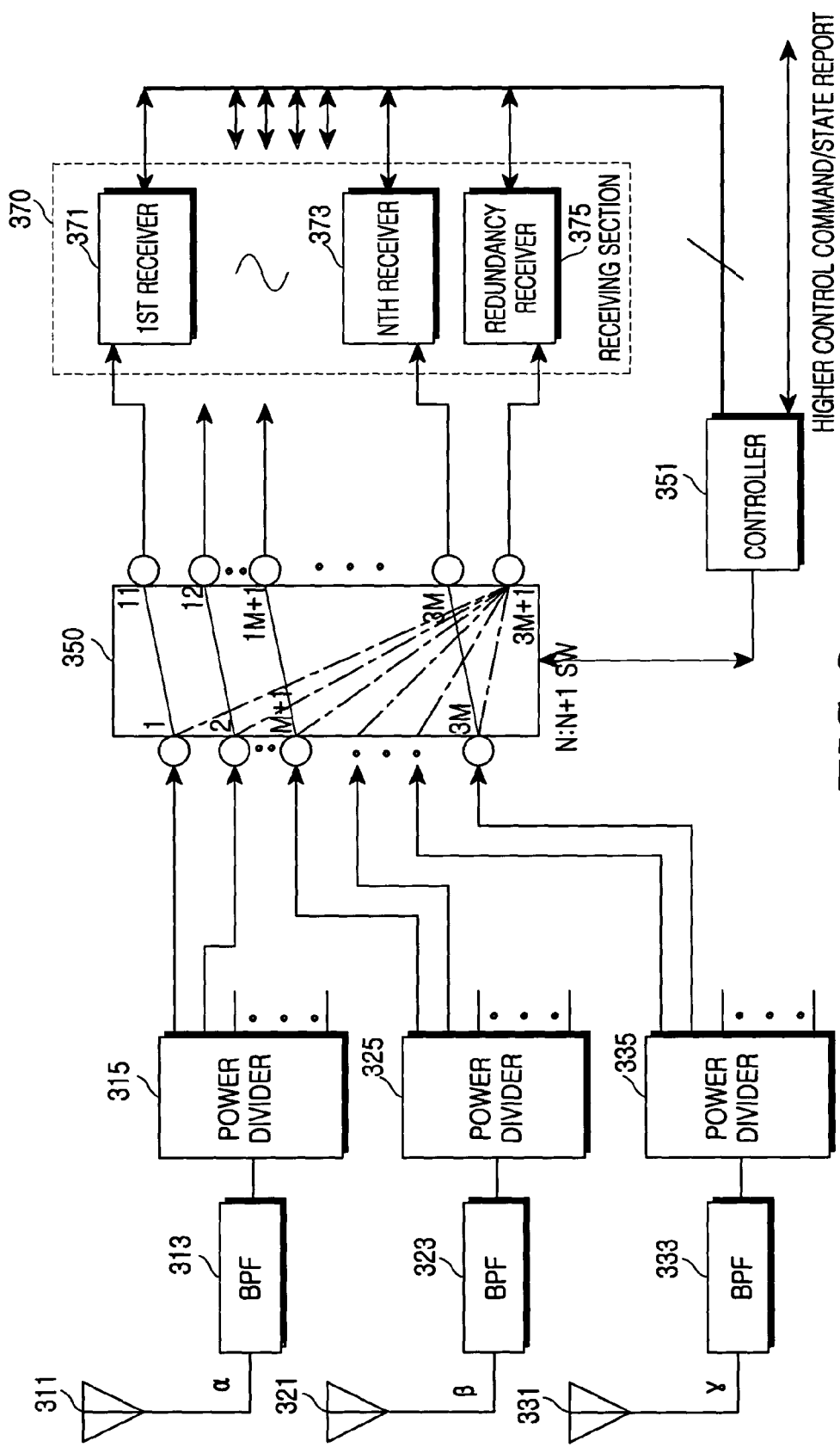
FIG. 3 is a block diagram illustrating an internal structure of a conventional BTS having three sectors and M number of FAs.
Figure 4:
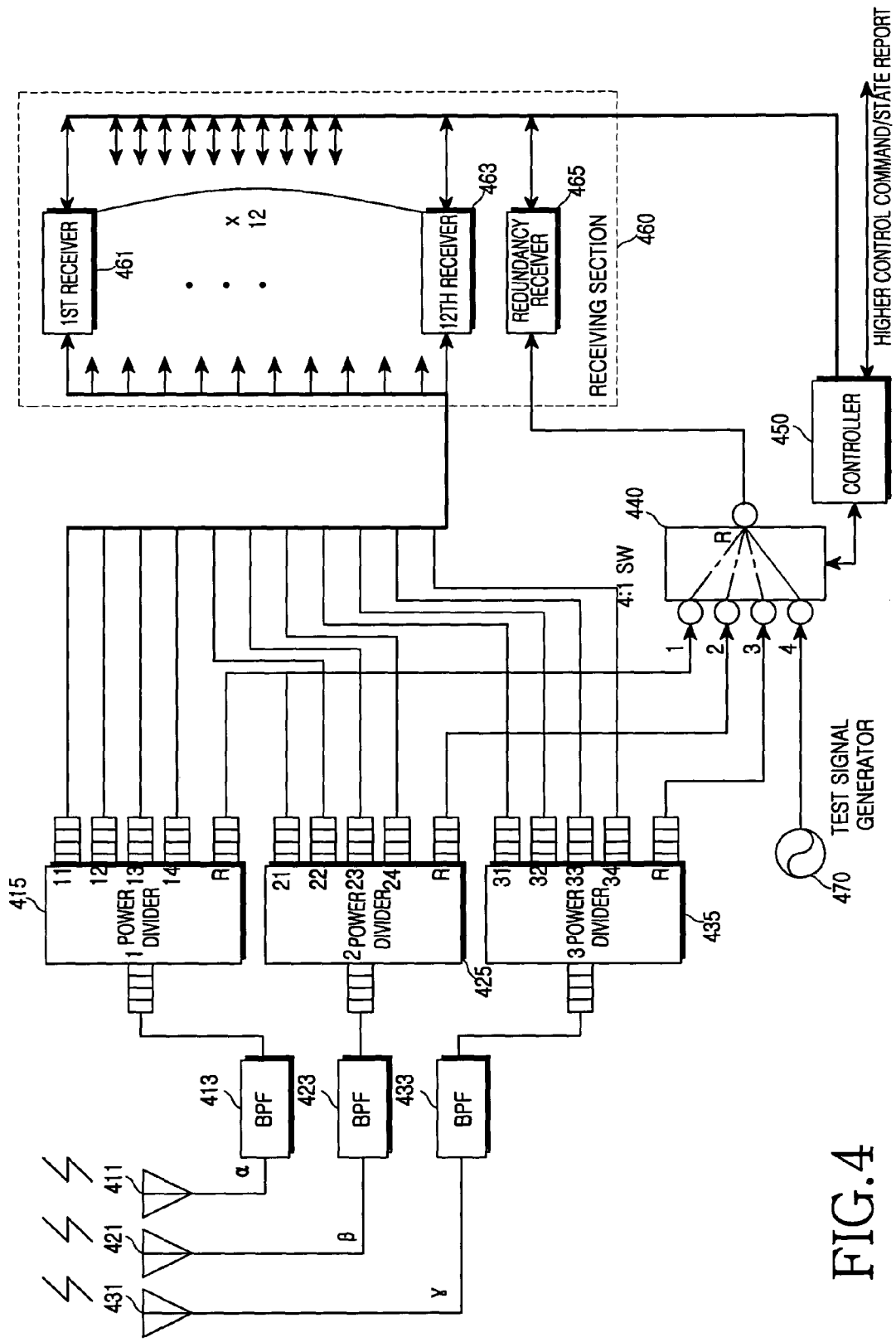
FIG. 4 is a block diagram illustrating an internal structure of a BTS according to an embodiment of the present invention, which has three sectors and four FAs.

FIG. 4 is a block diagram illustrating an internal structure of a Base station Transceiver Subsystem (BTS) according to an embodiment of the present invention, which has three sectors and four Frequency Assignments (FAs).

Referring to FIG. 4, the BTS has three sectors and four FAs. Therefore, each of the three sectors has a reception structure for each of the four FAs. For the α sector, the BTS includes an antenna 411 for receiving signals from the air, a band pass filter 413, and a power divider 415. For the β sector, the BTS includes an antenna 421, a band pass filter 423, and a power divider 425. Also, for the γ sector, the BTS includes an antenna 431, a band pass filter 433, and a power divider 435. In addition, the BTS includes a receiving section 460, a 4:1 switch 440, a test signal generator 470, and a controller 450. The receiving section 460 demodulates the signals outputted from the power dividers 415, 425, and 435 in a demodulation scheme corresponding to a modulation scheme of the transmitter. The test signal generator 470 generates a test signal. The controller 450 controls the operation of the 4:1 switch 440 for connecting the signals outputted from the power dividers 415, 425, and 435 to the corresponding receivers in the receiving section 460 according to the states of the receivers. The receiving section 460 includes receivers for processing α sector signals, receivers for processing β sector signals, receivers for processing γ sector signals, and a redundancy receiver provided for when any of the receivers for processing the α, β, and γ sector signals functions erroneously.

Hereinafter, processes through which signals received through the α, β, and γ sectors are transferred to the corresponding receivers will be described, and a process through which a signal received through the α sector is transferred to corresponding receivers will be first described.

First, when an α sector signal is received through the antenna 411, the antenna 411 outputs the received signal to the band pass filter 413. The band pass filter 413 receives the signal outputted from the antenna 411, filters the received signal in accordance with a predetermined band, and then outputs the filtered signal to the power divider 415. Here, the band pass filter 413 eliminates components of unnecessary bands included in the signal outputted from the antenna 411 through the filtering. The power divider 415 divides the signal outputted from the band pass filter 413 into five equal-power signals each having one-fifth power and outputs the divided signals to the receivers for processing the α sector signals in the receiving section 460. there, the power divider 415 divides the signal outputted from the band pass filter 413 into five equal-power signals each having one-fifth power because the BTS has four FAs and requires a separate signal for the redundancy receiver. FIG. 4 shows a portion of the receivers for processing the α, β, and γ sector signals. However, in the receiving section 460, the first receiver 461 to the fourth receiver (not shown) process the α sector signals, the fifth receiver (not shown) to eighth receiver (not shown) process the β sector signals, and the ninth receiver (not shown) to the twelfth receiver 465 process the γ sector signals.

The power divider 415 has one input port for receiving the signal outputted from the band pass filter 413 and five output ports for outputting the five power-divided signals, each having one-fifth power, to corresponding receivers. From among the five output ports, the output ports 11 to 14 are ports through which four signals from among the five power-divided signals are outputted to the first receiver 461 to the fourth receiver when the first receiver 461 to the fourth receiver all are operating normally, and the output port R is a port through which the remaining one signal from among the five power-divided signals is outputted to the redundancy receiver 465 when one of the first receiver 461 to the fourth receiver functions erroneously. The first receiver 461 to the fourth receiver demodulate the signals outputted from the power divider 415 according to a respectively predetermined demodulation scheme.

Second, a process through which a signal received through the β sector is transferred to corresponding receivers will be described below.

When a β sector signal is received through the antenna 421, the antenna 421 outputs the received signal to the band pass filter 423. The band pass filter 423 receives the signal outputted from the antenna 421, filters the received signal in accordance with a predetermined band, and then outputs the filtered signal to the power divider 425. The power divider 425 divides the signal outputted from the band pass filter 423 into five equal-power signals each having one-fifth power and outputs the divided signals to receivers for processing the β sector signal, that is, the fifth to eighth receivers in the receiving section 460.

The power divider 425 has one input port for receiving the signal outputted from the band pass filter 423 and five output ports for outputting the five power-divided signals, each having one-fifth power, to corresponding receivers. From among the five output ports, the output ports 21 to 24 are ports through which four signals from among the five power-divided signals are outputted to the fifth to eighth receivers when the fifth to eighth receivers all are operating normally, and the output port R is a port through which the remaining one signal from among the five power-divided signals is outputted to the redundancy receiver 465 when one of the fifth to eighth receivers functions erroneously. The fifth to eighth receivers demodulate the signals outputted from the power divider 425 according to a respectively predetermined demodulation scheme.

Third, a process through which a signal received through the γ sector is transferred to corresponding receivers will be described below.

When a γ sector signal is received through the antenna 431, the antenna 431 outputs the received signal to the band pass filter 433. The band pass filter 433 receives the signal outputted from the antenna 431, filters the received signal in accordance with a predetermined band, and then outputs the filtered signal to the power divider 435. The power divider 435 divides the signal outputted from the band pass filter 433 into five equal-power signals each having one-fifth power and outputs the divided signals to receivers for processing the γ sector signal, that is, the ninth receiver to the twelfth receiver 463 in the receiving section 460.

The power divider 435 has one input port for receiving the signal outputted from the band pass filter 433 and five output ports for outputting the five power-divided signals, each having one-fifth power, to corresponding receivers. From among the five output ports, the output ports 31 to 34 are ports through which four signals from among the five power-divided signals are outputted to the ninth receiver to twelfth receiver 463 when the ninth receiver to twelfth receiver 463 all are operating normally, and the output port R is a port through which the remaining one signal from among the five power-divided signals is outputted to the redundancy receiver 465 when one of the ninth receiver to twelfth receiver 463 functions erroneously. The ninth receiver to twelfth receiver 463 demodulate the signals outputted from the power divider 435 according to a respectively predetermined demodulation scheme.

While the signals received through the α, β, and γ sectors in this way are normally demodulated in the corresponding receivers, any receiver from among the receivers described above may function erroneously. When one of the receivers functions erroneously, the redundancy receiver 465 is used in place of the erroneous receiver which cannot perform a normal operation of demodulating a received signal. That is, the connection is switched over from the erroneous receiver to the redundancy receiver 465, so that the redundancy receiver 465 can perform the demodulation of the received signal on behalf of the erroneous receiver. In switching the connection over from the erroneous receiver to the redundancy receiver 465, the present invention does not employ the conventional N:(N+1) switch construction but employs direct control of the ports of the power divider, thereby eliminating the complicated switch construction. The elimination of the complicated switch construction removes the need for the supplementary devices in relation to the switch construction, thereby overcoming the spatial restriction and reducing the manufacturing cost.

Further, as previously described for the prior art, in the case where the redundancy receiver 465 is in an abnormal state, even after a signal having been processed by the erroneous receiver is connected to the redundancy receiver 465, the signal cannot be normally processed. Therefore, in an embodiment of the present invention, the redundancy receiver 465 is periodically checked to determine whether it is in a normal state or not, as will be described hereinafter.

First, signals outputted through the output ports R of the power dividers 415, 425, and 435 are inputted to the 4:1 switch 440. That is, the signal outputted from the output port R of the power divider 415 is inputted to the input port 1 of the 4:1 switch 440, the signal outputted from the output port R of the power divider 425 is inputted to the input port 2 of the 4:1 switch 440, and the signal outputted from the output port R of the power divider 435 is inputted to the input port 3 of the 4:1 switch 440. Further, a test signal outputted from the test signal generator 470 is inputted to the remaining input port 4 of the 4:1 switch 440. The test signal generator 470 generates the test signal for judging whether the redundancy receiver 465 is in a normal state or not. In an ordinary state, the controller 450 controls the 4:1 switch 440 to connect the test signal generated in the test signal generator 470 to the redundancy receiver 465. The redundancy receiver 465 receives and processes the test signal from the 4:1 switch 440. From the processed result of the test signal, the controller 450 determines whether the redundancy receiver 465 is in a normal state or not.

While all of the receivers are operating normally, if one of the first receiver 461 to the twelfth receiver 463 functions erroneously, the controller 450 controls the 4:1 switch 440 to connect the signal that was connected to the erroneous receiver to the redundancy receiver 465. For example, if the first receiver 461 functions erroneously, the controller 450 controls the 4:1 switch 440 to connect the signal outputted from the output port R of the power divider 415 to the redundancy receiver 465. Then, the redundancy receiver 465 demodulates the signal in a predetermined demodulation scheme on behalf of the first receiver 461.

While the above description with reference to FIG. 4 is given of an internal structure of a BTS having three sectors and four FAs, an internal structure of a BTS having four FAs with no sectoral structure will be described hereinafter with reference to FIG. 5.

Figure 5:
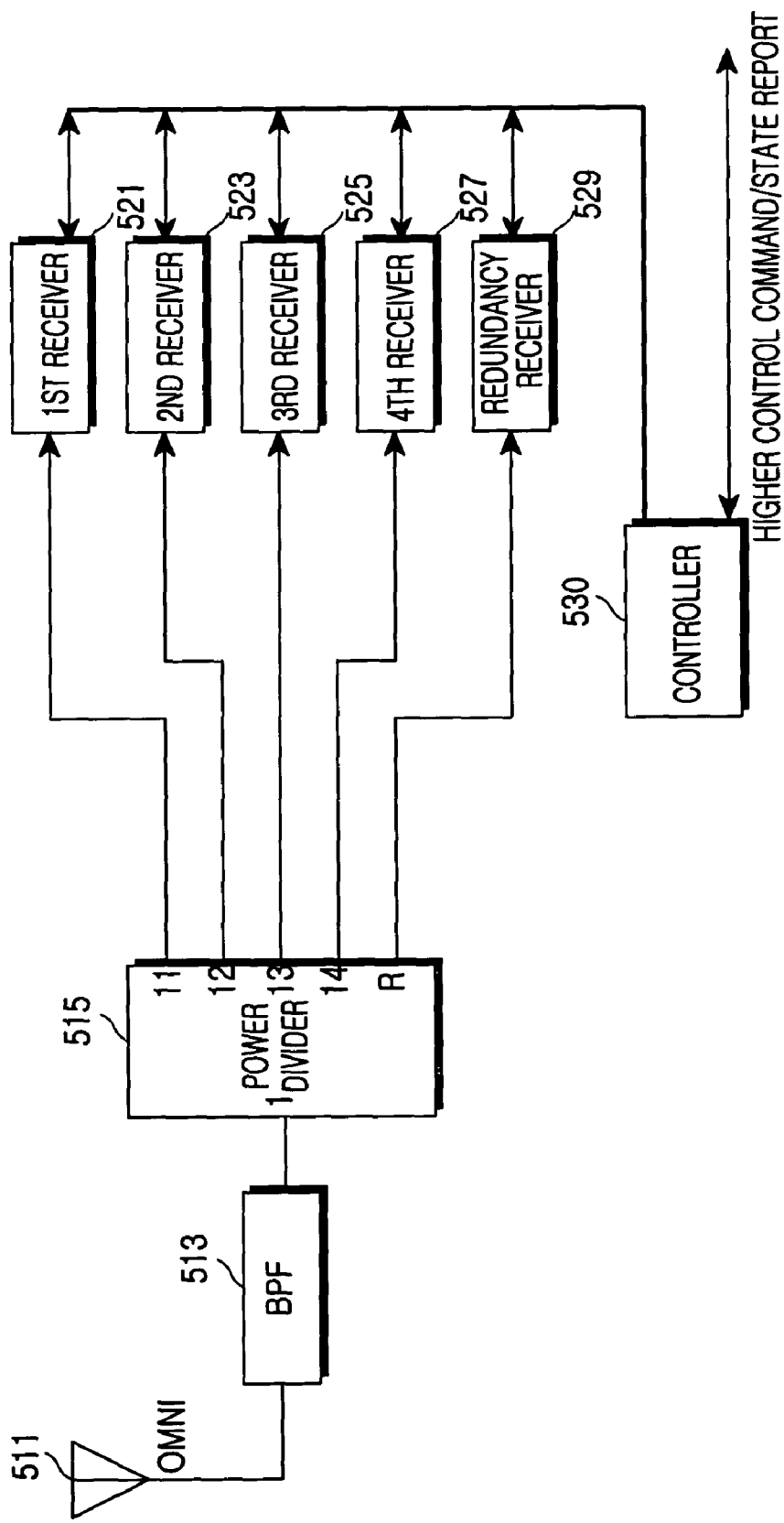
FIG. 5 is a block diagram illustrating an internal structure of a BTS according to another embodiment of the present invention, which has four FAs with no sectoral structure.

FIG. 5 is a block diagram illustrating an internal structure of a BTS according to another embodiment of the present invention, which has four FAs with no sectoral structure.

The BTS may have either a sectoral structure as that described with reference to FIG. 4 or an omni-directional structure with no sector. The BTS shown in FIG. 5 has an omni-directional structure in which the BTS receives signals via a single omni-directional antenna. Referring to FIG. 5, when a signal is received through an antenna 511, the antenna 511 outputs the received signal to a band pass filter 513. The band pass filter 513 receives the signal outputted from the antenna 511, filters the received signal in accordance with a predetermined band, and then outputs the filtered signal to a power divider 515. The power divider 515 divides the signal outputted from the band pass filter 513 into five equal-power signals each having one-fifth power, and outputs the five power-divided signals to the first receiver 521, the second receiver 523, the third receiver 525, the fourth receiver 527, and the fifth receiver 529, respectively.

Further, the controller 530 continuously monitors the states of the first receiver 521 to the fourth receiver 527. When one of the first receiver 521 to the fourth receiver 527 functions erroneously, the controller 530 enables the redundancy receiver 529 to perform the demodulation on behalf of the erroneous receiver. For example, when the first receiver 521 functions erroneously, the controller 530 stops the demodulating operation of the first receiver 521 and enables the redundancy receiver 529 to perform the demodulating operation on behalf of the erroneous receiver. Also in this case, in switching the connection over from the erroneous receiver to the redundancy receiver 529, the present invention does not employ the conventional N:(N+1) switch construction but employs direct control of ports of the power divider, thereby eliminating the complicated switch construction. The elimination of the complicated switch construction removes the need for the supplementary devices in relation to the switch construction, thereby overcoming the spatial restriction and reducing the manufacturing cost.

While the above description with reference to FIG. 5 is given of an internal structure, especially a receiver connection structure, of a BTS having four FAs with no sectoral structure, an internal structure of a BTS having N number of sectors and M number of FAs will be described hereinafter with reference to FIG. 6.

Figure 6:
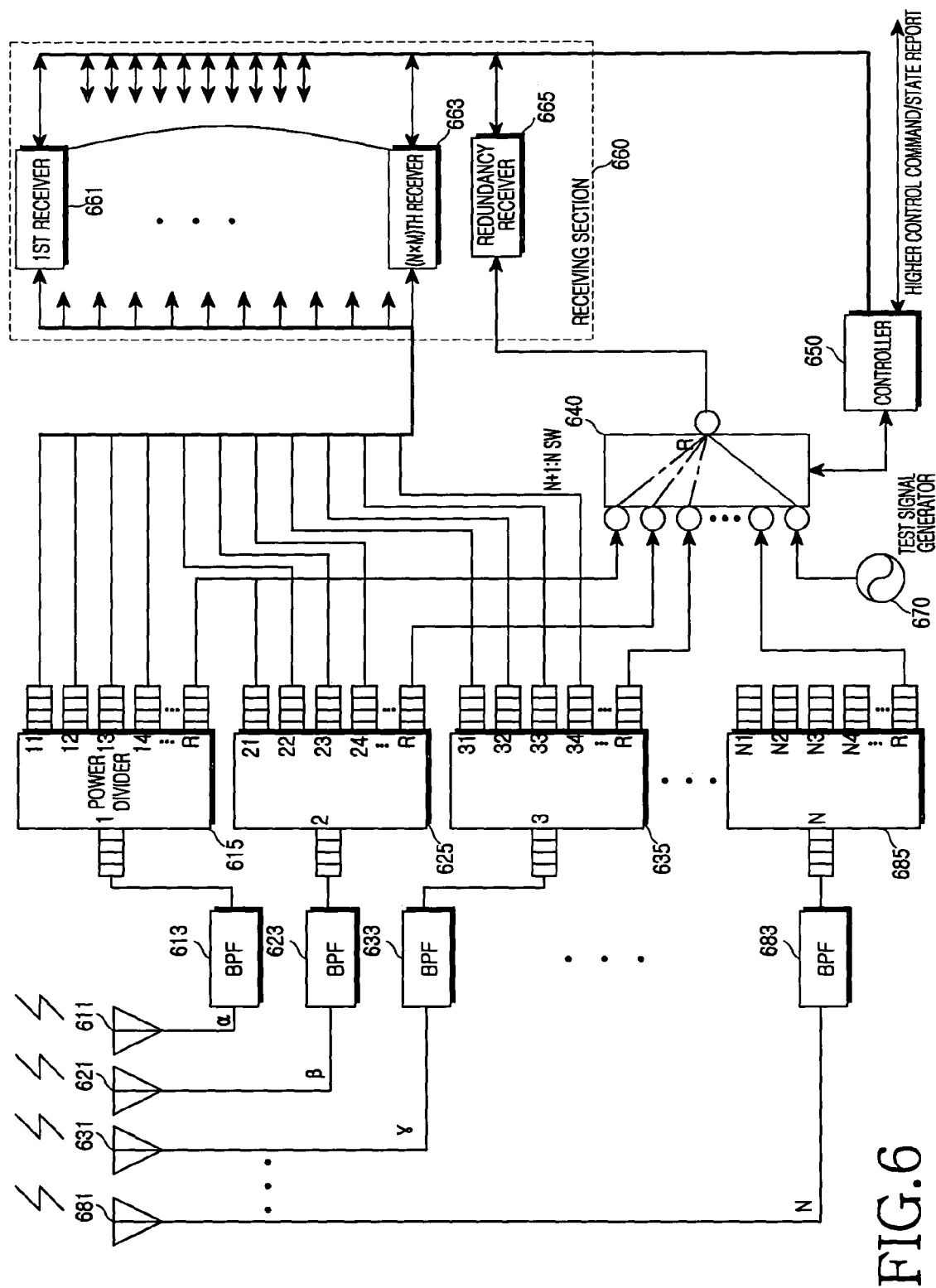
FIG. 6 is a block diagram illustrating an internal structure of a BTS according to another embodiment of the present invention, which has N number of sectors and M number of FAs.

FIG. 6 is a block diagram illustrating an internal structure of a BTS according to another embodiment of the present invention, which has N number of sectors and M number of FAs.

Referring to FIG. 6, the BTS has N number of sectors and M number of FAs. Therefore, each of the N sectors has a reception structure for each of the M FAs. In the same manner as the description in relation to FIG. 4, for the α sector, the BTS includes an antenna 611 for receiving signals from the air, a band pass filter 613, and a power divider 615. For the β sector, the BTS includes an antenna 621, a band pass filter 623, and a power divider 625. For the γ sector, the BTS includes an antenna 631, a band pass filter 633, and a power divider 635. In this way, for each intermediate sector, the BTS includes a corresponding antenna, a corresponding band pass filter, and a corresponding power divider. For the N sector, which is the last sector, the BTS includes an antenna 681, a band pass filter 683, and a power divider 685.

In addition, the BTS includes a receiving section 660, an (N+1):1 switch 640, a test signal generator 670, and a controller 650. The receiving section 660 demodulates the signals outputted from the power dividers for the N sectors in a demodulation scheme corresponding to a modulation scheme of the transmitting side. The test signal generator 670 generates a test signal. The controller 650 controls the operation of the (N+1):1 switch 640 for connecting the signals outputted from the power dividers 615, 625, and 635, that is, redundancy signals, to the corresponding receivers in the receiving section 660 according to the states of the receivers. Here, the receiving section 660 includes receivers for processing $\alpha$ sector signals, receivers for processing $\beta$ sector signals, receivers for processing $\gamma$ sector signals, . . . , receivers for processing N sector signals, which are the last sector signals, and a redundancy receiver provided in case any of the receivers for processing the $\alpha$ sector to N sector signals functions erroneously.

Hereinafter, processes through which signals received through the $\alpha$ to N sectors are transferred to the corresponding receivers will be described, and a process through which a signal received through the $\alpha$ sector is transferred to corresponding receivers will be first described.

First, when an $\alpha$ sector signal is received through the antenna 611, the antenna 611 outputs the received signal to the band pass filter 613. The band pass filter 613 receives the signal outputted from the antenna 611, filters the received signal in accordance with a predetermined band, and then outputs the filtered signal to the power divider 615. The power divider 615 divides the signal outputted from the band pass filter 613 into equal-power signals each having 1/M+1) power and outputs the power-divided signals to the receivers for processing the $\alpha$ sector signals in the receiving section 660. Here, the power divider 615 divides the signal outputted from the band pass filter 613 into equal-power signals each having 1/(M+1) power because the BTS has M FAs and also requires a separate signal for the redundancy receiver. FIG. 6 shows a portion of the receivers for processing the $\alpha$ to N sector signals. However, in the receiving section 660, M number of receivers from the first receiver 661 to the Mth receiver (not shown) process the $\alpha$ sector signals, M number of receivers from the (M+1)th to 2Mth receivers (not shown) process the $\beta$ sector signals, M number of receivers from the (2M+1)th to 3Mth receivers process the $\gamma$ sector signals, . . . , and M number of receivers from the $\{(N-1)M+1\}$th receiver (not shown) to (N×M)th receiver 663 process the N sector signals.

The power divider 615 has one input port for receiving the signal outputted from the band pass filter 613 and (M+1) number of output ports for outputting the (M+1) number of power-divided signals, each having 1/(M+1) power, to corresponding receivers. From among the (M+1) number of output ports, the output ports 11 to 1M are ports through which M signals from among the (M+1) power-divided signals are outputted to the first receiver 661 to the Mth receiver when all of the first receiver 661 to the Mth receiver are operating normally, and the output port R is a port through which the remaining one signal from among the (M+1) power-divided signals is outputted to the redundancy receiver 665 when one of the first receiver 661 to the Mth receiver functions erroneously. The first receiver 661 to the Mth receiver demodulate the signals outputted from the power divider 615 according to a respectively predetermined demodulation scheme.

Second, a process through which a signal received through the $\beta$ sector is transferred to corresponding receivers will be described below.

When a $\beta$ sector signal is received through the antenna 621, the antenna 621 outputs the received signal to the band pass filter 623. The band pass filter 623 receives the signal outputted from the antenna 621, filters the received signal in accordance with a predetermined band, and then outputs the filtered signal to the power divider 625. The power divider 625 divides the signal outputted from the band pass filter 623 into equal-power signals each having 1/(M+1) power and outputs the power-divided signals to the receivers for processing the $\beta$ sector signals in the receiving section 660, that is, the (M+1)th to 2Mth receivers.

The power divider 625 has one input port for receiving the signal outputted from the band pass filter 623 and (M+1) number of output ports for outputting the (M+1) number of power-divided signals, each having 1/(M+1) power, to corresponding receivers. From among the (M+1) number of output ports, the output ports 21 to 2M are ports through which M signals from among the (M+1) power-divided signals are outputted to the (M+1)th to 2Mth receivers when all of the (M+1)th to 2Mth receivers are operating normally, and the output port R is a port through which the remaining one signal from among the (M+1) power-divided signals is outputted to the redundancy receiver 665 when one of the (M+1)th to 2Mth receivers functions erroneously. The (M+1)th to 2Mth receivers demodulate the signals outputted from the power divider 625 according to a respectively predetermined demodulation scheme.

Third, a process through which a signal received through the $\gamma$ sector is transferred to corresponding receivers will be described below.

When a $\gamma$ sector signal is received through the antenna 631, the antenna 631 outputs the received signal to the band pass filter 633. The band pass filter 633 receives the signal outputted from the antenna 631, filters the received signal in accordance with a predetermined band, and then outputs the filtered signal to the power divider 635. The power divider 635 divides the signal outputted from the band pass filter 633 into equal-power signals each having 1/(M+1) power and outputs the power-divided signals to the receivers for processing the $\gamma$ sector signals in the receiving section 660, that is, the (2M+1)th to 3Mth receivers.

The power divider 635 has one input port for receiving the signal outputted from the band pass filter 633 and (M+1) number of output ports for outputting the (M+1) number of power-divided signals, each having 1/(M+1) power, to corresponding receivers. From among the (M+1) number of output ports, the output ports 31 to 3M are ports through which M signals from among the (M+1) power-divided signals are outputted to the (2M+1)th to 3Mth receivers when all of the (2M+1)th to 3Mth receivers are operating normally, and the output port R is a port through which the remaining one signal from among the (M+1) power-divided signals is outputted to the redundancy receiver 665 when one of the (2M+1)th to 3Mth receivers functions erroneously. The (2M+1)th to 3Mth receivers demodulate the signals outputted from the power divider 635 according to a respectively predetermined demodulation scheme.

In the same manner as the processes through which the signals received through the $\alpha$, $\beta$, and $\gamma$ sectors are connected to the corresponding receivers, signals received through the remaining sectors are connected to the corresponding receivers.

Specifically, a process through which a signal received through the N sector is transferred to corresponding receivers will be described below.

When an N sector signal is received through an antenna 681, the antenna 681 outputs the received signal to a band pass filter 683. The band pass filter 683 receives the signal outputted from the antenna 681, filters the received signal in accordance with a predetermined band, and then outputs the filtered signal to a power divider 685. The power divider 685 divides the signal outputted from the band pass filter 683 into equal-power signals each having 1/(M+1) power and outputs the power-divided signals to the receivers for processing the N sector signals in the receiving section 660, that is, the {(N−1)M+1}th receiver to the (N×M)th receiver 663.

The power divider 685 has one input port for receiving the signal outputted from the band pass filter 683 and (M+1) number of output ports for outputting the (M+1) number of power-divided signals, each having 1/(M+1) power, to corresponding receivers. From among the (M+1) number of output ports, the output ports N1 to NM are ports through which M signals from among the (M+1) power-divided signals are outputted to the {(N−1)M+1}th receiver to the (N×M)th receiver 663 when all of the {(N−1)M+1}th receiver to the (N×M)th receiver 663 are operating normally, and the output port R is a port through which the remaining one signal from among the (M+1) power-divided signals is outputted to the redundancy receiver 665 when one of the {(N−1)M+1}th receiver to the (N×M)th receiver 663 functions erroneously. The {(N−1)M+1}th receiver to the (N×M) th receiver 663 demodulate the signals outputted from the power divider 685 according to a respectively predetermined demodulation scheme.

While the signals received through the α to N sectors in this way are normally demodulated in the corresponding receivers, any receiver from among the receivers described above may function erroneously. When one of the receivers functions erroneously, the redundancy receiver 665 is used in place of the erroneous receiver which cannot perform a normal operation of demodulating a received signal. That is, the connection is switched over from the erroneous receiver to the redundancy receiver 665, so that the redundancy receiver 665 can perform the demodulation of the received signal on behalf of the erroneous receiver, as will be described in detail hereinafter with reference to FIG. 6.

Each of the power dividers for processing the sector signals, which include the power dividers 615 for processing the α sector signals, the power dividers 625 for processing the β sector signals, the power dividers 635 for processing the γ sector signals, . . . , and the power dividers 685 for processing the N sector signals, has a redundancy output port R for outputting a signal to the redundancy receiver 665. The controller 650 controls the states of the first receiver 661 to the (N×M)th receiver 663 for processing the sector signals. When the controller 650 detects the existence of any erroneous receiver from among the first receiver 661 to the (N×M)th receiver 663, the controller 650 controls the (N+1):1 switch 640 to switch the connection over from the erroneous receiver to the redundancy receiver 665. As described above, it is required that the redundancy receiver 665 should keep operating normally in order to perform a normal operation when any of the other receivers functions erroneously. Therefore, the redundancy receiver 665 continuously processes the test signal generated by the test signal generator 670, and the controller 650 continuously monitors the state of the redundancy receiver 665 by means of the processed result of the test signal by the redundancy receiver 665.

Meanwhile, after switching the connection over from the erroneous receiver to the redundancy receiver 665, the controller controls the (N+1):1 switch 640 to interrupt the connection from the input port of the test signal to the redundancy receiver 665 and connect the redundancy receiver 665 to an input port for receiving a signal outputted from a redundancy signal output port R of a power divider connected to the erroneous receiver. For example, if the first receiver 661 for processing the α sector signal functions erroneously, the controller 650 controls the (N+1):1 switch 640 to connect the signal, which is outputted from the output port R of the power divider 615 connected to the first receiver 661, to the redundancy receiver 665. Then, the redundancy receiver 665 demodulates the signal outputted from the output port R of the power divider 615 in the same demodulation scheme as that in the first receiver 661. In the present invention as described above, in switching the connection over from the erroneous receiver to the redundancy receiver 665, ports of the power divider are directly controlled, so that the complicated switch construction of the prior art can be eliminated. This elimination of the complicated switch construction removes the need for the supplementary devices in relation to the switch construction, thereby overcoming the spatial restriction and reducing the manufacturing cost.

In the BTS in a mobile communication system according to the present invention as described above, each power divider outputs a separate signal for a redundancy receiver, so as to enable the signal to be connected to the redundancy receiver directly through an output port of the power divider when any receiver in a receiving section functions erroneously, thereby eliminating a complicated switch construction. This elimination of the complicated switch construction removes the need for the supplementary devices in relation to the switch construction, thereby overcoming the spatial restriction and reducing the manufacturing cost. Moreover, in a base station transceiver subsystem according to the present invention, the state of the redundancy receiver is continuously monitored to prevent a service provided by the base station transceiver subsystem from being stopped due to an abnormal operation of the redundancy receiver, thereby increasing the security and efficiency in providing the service.

While the invention has been shown and described with reference to certain several embodiments thereof, it will be understood by those skilled in the art that various changes in form and details may be made therein without departing from the spirit and scope of the invention as defined by the appended claims.

What is claimed is:

1. An apparatus for controlling a duplication structure of a Base station Transceiver Subsystem (BTS), the BTS having N number of sectors including a first sector to an Nth sector and M number of Frequency Assignments (FAs) including a first FA to an Nth FA, the apparatus comprising:

N number of power dividers, each of which has M number of output ports and one redundancy output port, each of the power dividers dividing an input signal into equal-power signals each of the equal-power signals having 1/(M+1) power and outputting the power-divided signals through the M number of output ports and one redundancy output port;

(N×M) number of receivers for demodulating signals outputted from the output ports of the N number of power dividers, respectively;

a redundancy receiver for demodulating a signal which has been processed by and is switched over from one of the (N×M) number of receivers according to a predetermined control;

a switch connected to each of redundancy output ports of the N number of power dividers, the switch connecting a signal outputted from one of the redundancy output ports to the redundancy receiver according to a predetermined control; and a controller which monitors operation states of the (N×M) number of receivers and controls the switch to connect a redundancy signal to the redundancy receiver when the controller detects one abnormally-operating receiver from among the (N×M) number of receivers, the redundancy signal being outputted from a redundancy output port of a power divider connected to the abnormally-operating receiver.

2. The apparatus as claimed in claim 1, further comprising a test signal generator for generating a test signal for testing whether the redundancy receiver is operating normally or not, the test signal generator having one port connected to the switch.

3. The apparatus as claimed in claim 2, wherein the controller controls the switch to connect the test signal to the redundancy receiver when all of the (N×M) number of receivers are operating normally, and determines whether the redundancy receiver is operating normally or not by means of a result obtained after the redundancy receiver processes the test signal.

4. An apparatus for controlling a duplication structure of a Base station Transceiver Subsystem (BTS), the BTS having M number of Frequency Assignments (FAs) including a first FA to an Nth FA, the apparatus comprising:

a power divider having M number of output ports and one redundancy output port, the power divider dividing an input signal into equal-power signals each having 1/(M+1) power and outputting the power-divided signals through the M number of output ports and one redundancy output port;

M number of receivers for demodulating signals outputted from the power divider, respectively;

a redundancy receiver for demodulating a signal which has been processed by and is switched over from one of the M number of receivers according to a predetermined control;

a switch connected to the redundancy output port, the switch connecting a signal outputted from the redundancy output port to the redundancy receiver according to a predetermined control; and a controller which monitors operation states of the M number of receivers and controls the switch to connect a redundancy signal to the redundancy receiver when the controller detects one abnormally-operating receiver from among the M number of receivers, the redundancy signal being outputted from the redundancy output port.

5. An apparatus for controlling a duplication structure of a Base station Transceiver Subsystem (BTS), the BTS having three sectors including an α sector to a γ sector and four Frequency Assignments (FAs) including a first FA to a fourth FA, the apparatus comprising:

three power dividers, each of which has four output ports and one redundancy output port, each of the power dividers dividing an input signal into equal-power signals each having 1/5 power and outputting the power-divided signals through the four output ports and one redundancy output port;

twelve receivers for demodulating signals outputted from the output ports of the three power dividers, respectively;

a redundancy receiver for demodulating a signal which has been processed by and is switched over from one of the twelve receivers according to a predetermined control;

a 4:1 switch connected to each of redundancy output ports of the three power dividers, the 4:1 switch connecting a signal outputted from one of the redundancy output ports to the redundancy receiver according to a predetermined control; and a controller which monitors operation states of the twelve receivers and controls the 4:1 switch to connect a redundancy signal to the redundancy receiver when the controller detects one abnormally-operating receiver from among the twelve receivers, the redundancy signal being outputted from a redundancy output port of a power divider connected to the abnormally-operating receiver.

6. The apparatus as claimed in claim 5, further comprising a test signal generator for generating a test signal for testing whether the redundancy receiver is operating normally or not, the test signal generator having one port connected to the 4:1 switch.

7. The apparatus as claimed in claim 6, wherein the controller controls the 4:1 switch to connect the test signal to the redundancy receiver when all of the twelve receivers are operating normally, and determines whether the redundancy receiver is operating normally or not by means of a result obtained after the redundancy receiver processes the test signal.

8. A method for controlling a duplication structure of a Base station Transceiver Subsystem (BTS), the BTS having N number of sectors including a first sector to an Nth sector and M number of Frequency Assignments (FAs) including a first FA to an Nth FA, the method comprising the steps of:

dividing an input signal into equal-power signals via N number of power dividers, each of which has M number of output ports and one redundancy output port, and each of the equal-power signals having 1/(M+1) power;

outputting the power-divided signals through the M number of output ports and one redundancy output port;

demodulating signals output from the output ports of the N number of power dividers, respectively via (N×M) number of receivers;

demodulating a signal which has been processed by and is switched over from one of the (N×M) number of receivers according to a predetermined control via a redundancy receiver;

connecting to each of redundancy output ports of the N number of power dividers via a switch, the switch connecting a signal output from one of the redundancy output ports to the redundancy receiver according to a predetermined control; and monitoring operation states of the (N×M) number of receivers and controlling the switch to connect a redundancy signal to the redundancy receiver when the controller detects one abnormally-operating receiver from among the (N×M) number of receivers via a controller, the redundancy signal being outputted from a redundancy output port of a power divider connected to the abnormally-operating receiver.

9. The method as claimed in claim 8, further comprising the step of:

generating a test signal for testing whether the redundancy receiver is operating normally or not via a test signal generator, the test signal generator having one port connected to the switch.

10. The method as claimed in claim 9, further comprising the step of:

controlling the switch to connect the test signal to the redundancy receiver when all of the (N×M) number of receivers are operating normally via the controller; and determining whether the redundancy receiver is operating normally or not by means of a result obtained after the redundancy receiver processes the test signal via the controller.

11. A method for controlling a duplication structure of a Base station Transceiver Subsystem (BTS), the BTS having M number of Frequency Assignments (FAs) including a first FA to an Nth FA, the method comprising the steps of:

dividing an input signal into equal-power signals each having 1/(M+1) power via a power divider having M number of output ports and one redundancy output port;

outputting the power-divided signals through the M number of output ports and one redundancy output port;

demodulating signals output from the power divider, respectively via M number of receivers;

demodulating a signal which has been processed by and is switched over from one of the M number of receivers according to a predetermined control via a redundancy receiver;

connecting to the redundancy output port via a switch, the switch connecting a signal output from the redundancy output port to the redundancy receiver according to a predetermined control; and monitoring operation states of the M number of receivers and controlling the switch to connect a redundancy signal to the redundancy receiver when the controller detects one abnormally-operating receiver from among the M number of receivers via a controller, the redundancy signal being output from the redundancy output port.

12. A method for controlling a duplication structure of a Base station Transceiver Subsystem (BTS), the BTS having three sectors including an α sector to a γ sector and four Frequency Assignments (FAs) including a first FA to a fourth FA, the method comprising the steps of:

dividing an input signal into equal-power signals each having 1/5 power via three power dividers, each of which has four output ports and one redundancy output port;

outputting the power-divided signals through the four output ports and one redundancy output port;

demodulating signals output from the output ports of the three power dividers, respectively via twelve receivers;

demodulating a signal which has been processed by and is switched over from one of the twelve receivers according to a predetermined control via a redundancy receiver;

connecting to each of redundancy output ports of the three power dividers via a 4:1 switch, the 4:1 switch connecting a signal output from one of the redundancy output ports to the redundancy receiver according to a predetermined control; and monitoring operation states of the twelve receivers and controlling the 4:1 switch to connect a redundancy signal to the redundancy receiver when the controller detects one abnormally-operating receiver from among the twelve receivers via a controller, the redundancy signal being output from a redundancy output port of a power divider connected to the abnormally-operating receiver.

13. The method as claimed in claim 12, further comprising the step of:

generating a test signal for testing whether the redundancy receiver is operating normally or not via a test signal generator, the test signal generator having one port connected to the 4:1 switch.

14. The method as claimed in claim 13, further comprising the step of:

controlling the 4:1 switch to connect the test signal to the redundancy receiver when all of the twelve receivers are operating normally via the controller; and determining whether the redundancy receiver is operating normally or not by means of a result obtained after the redundancy receiver processes the test signal via the controller.

* * * * *